United States Patent [19]

Bonilauri

[11] Patent Number: 4,738,419
[45] Date of Patent: Apr. 19, 1988

[54] HOLDER FOR EXTRACTABLE AUTOMOBILE RADIOS, WITH CAM LOCKING

[75] Inventor: Pietro Bonilauri, Cadelbosco Sopra, Italy

[73] Assignee: Automelody S.p.A., Cadelbosco Sopra Reggio Emilia, Italy

[21] Appl. No.: 17,706

[22] Filed: Feb. 24, 1987

[51] Int. Cl.⁴ .............................................. G12B 9/00
[52] U.S. Cl. .................................... 248/27.1; 24/498
[58] Field of Search ............... 248/27.1, 27.3, DIG. 6; 24/498, 488, 590, 591

[56] References Cited

U.S. PATENT DOCUMENTS

| | | |
|---|---|---|
| 1,312,496 | 8/1919 | Anderson et al. .............. 24/498 X |
| 3,773,290 | 11/1973 | Mowery .......................... 24/498 X |
| 4,472,863 | 9/1984 | Durenec ............................ 24/498 |
| 4,478,331 | 10/1984 | Ruin ................................ 24/498 X |
| 4,527,760 | 7/1985 | Salacuse ........................ 24/590 X |
| 4,572,465 | 2/1986 | Rasca ............................... 248/27.1 |
| 4,623,110 | 11/1986 | Kanari ............................. 248/27.1 |

Primary Examiner—Ramon O. Ramirez
Attorney, Agent, or Firm—Bucknam and Archer

[57] ABSTRACT

A holder for extractable automobile radios comprises a parallelepipal box having a mouth provided externally with a flange arranged to abut against the instrument or dash panel of a motor vehicle, and behind which there are provided in at least two opposing walls of the box at least two profiled seats arranged to allow the off-centered end of a locking device to pass from the inside to the outside of the box and which, when rotated about the seat causes the instrument panel to become clamped between the flange and the off-centered end.

9 Claims, 3 Drawing Sheets

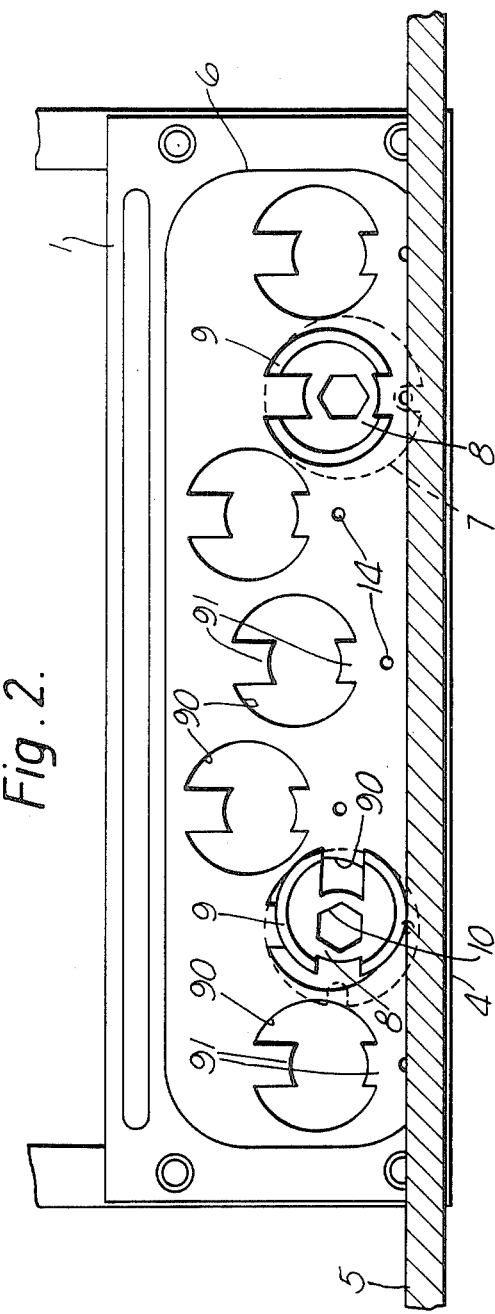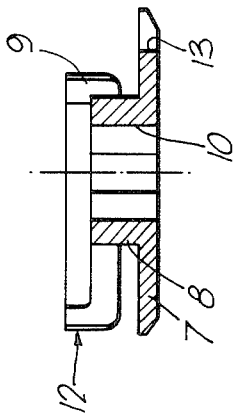

HOLDER FOR EXTRACTABLE AUTOMOBILE RADIOS, WITH CAM LOCKING

BACKGROUND OF THE INVENTION

This invention relates to the mounting of extractable automobile radios in general, and more particularly to a unit arranged to rapidly and easily lock said holder to the instrument panel of motor vehicles.

Motor vehicle instrument panels are known to normally comprise an opening of standard dimensions intended to receive, if required, a holder acting as a seat for an extractable automobile radio. The normal holders for extractable automobile radios are also known to comprise a sheet-metal parallelepipal which is normally open at one end to form the mouth for insertion of the automobile radio. On the outside of this mouth there is an abutment flange arranged to rest against the front marginal edge of said standard opening.

For fixing said box or holder to the vehicle instrument panel, appropriate clamping brackets are provided fitted with screws which pass through the abutment flange of the holder and through said instrument panel. This fixing system has however proved unsuitable for use on certain types of motor vehicles, especially of recent construction, because of the impossibility due to limited available space of obtaining automobile radio holders with an abutment flange sufficiently high to retain said screws. This is so for example in the case of the FIAT model "uno". As the height of said flange is strictly related to the space surrounding the seat for receiving the automobile radio, there is a requirement in this specific sector for a single fixing system for all types of holder whatever the height of their abutment flange.

SUMMARY OF THE INVENTION

The main object of the present invention is to satisfy this requirement within the framework of a simple and rational construction.

A further object is to simplify the installation and fixing of automobile radio holders by also obviating the need for making holes or the like in the vehicle instrument or dash panel, as is currently necessary.

In attaining said objects, the crux of this invention resides in providing a locking member having an off-centered head or portion, to be rotatably mounted in a seat situated to the rear of the holder abutment flange, with the off-centered portion situated external to the holder, so that on rotating said member, the instrument panel on which the holder is mounted becomes clamped between the flange of this latter and said off-centered portion.

At least two members are obviously provided, to be disposed in two opposing lateral walls of the holder.

According to the invention, said member comprises two parallel flat portions, of which at least one is of circular shape and which are connected together by an intermediate cylindrical portion. In this manner, between the two flat portions there is defined a groove able to receive the thickness of the holder wall, the circular-shaped flat portion being disposed eccentrically to said cylindrical portion.

The outer cylindrical surface of the cam formed by the eccentric portion is slightly irregular, for example knurled, said cam being provided with at least one preferably radially extending recess which terminates in correspondence with said cylindrical portion. For said cam, there is provided in the holder at least one identically shaped aperture arranged to enable it to pass to the outside of the holder, against the inner surface of which there rests the opposite flat portion of the said member.

According to an advantageous characteristic of the invention, a number of apertures arranged to allow passage of said cam are provided in the same wall of the holder, said aperture being disposed at different distances from the front abutment flange of the holder to enable this latter to be mounted on instrument panels of different thicknesses.

Alternatively, a single aperture of the aforesaid type can be provided, from which there extends a slot converging towards the abutment flange of the holder and having a width practically equal to the diameter of said intermediate cylindrical portion.

BRIEF DESCRIPTION OF THE DRAWINGS

The constructional characteristics and merits of the invention will be more apparent from the detailed description given hereinafter with reference to the figures of the accompanying drawing which show two preferred embodiments thereof by way of non-limiting example.

FIG. 2 is a partial view of the preceding figure from above.

FIG. 3 is a perspective view of the cam-shaped locking member.

FIG. 4 is a section on the line IV—IV of FIG. 3.

DETAILED DESCRIPTION OF THE PREFERRED EMBODIMENTS

Figure 1:
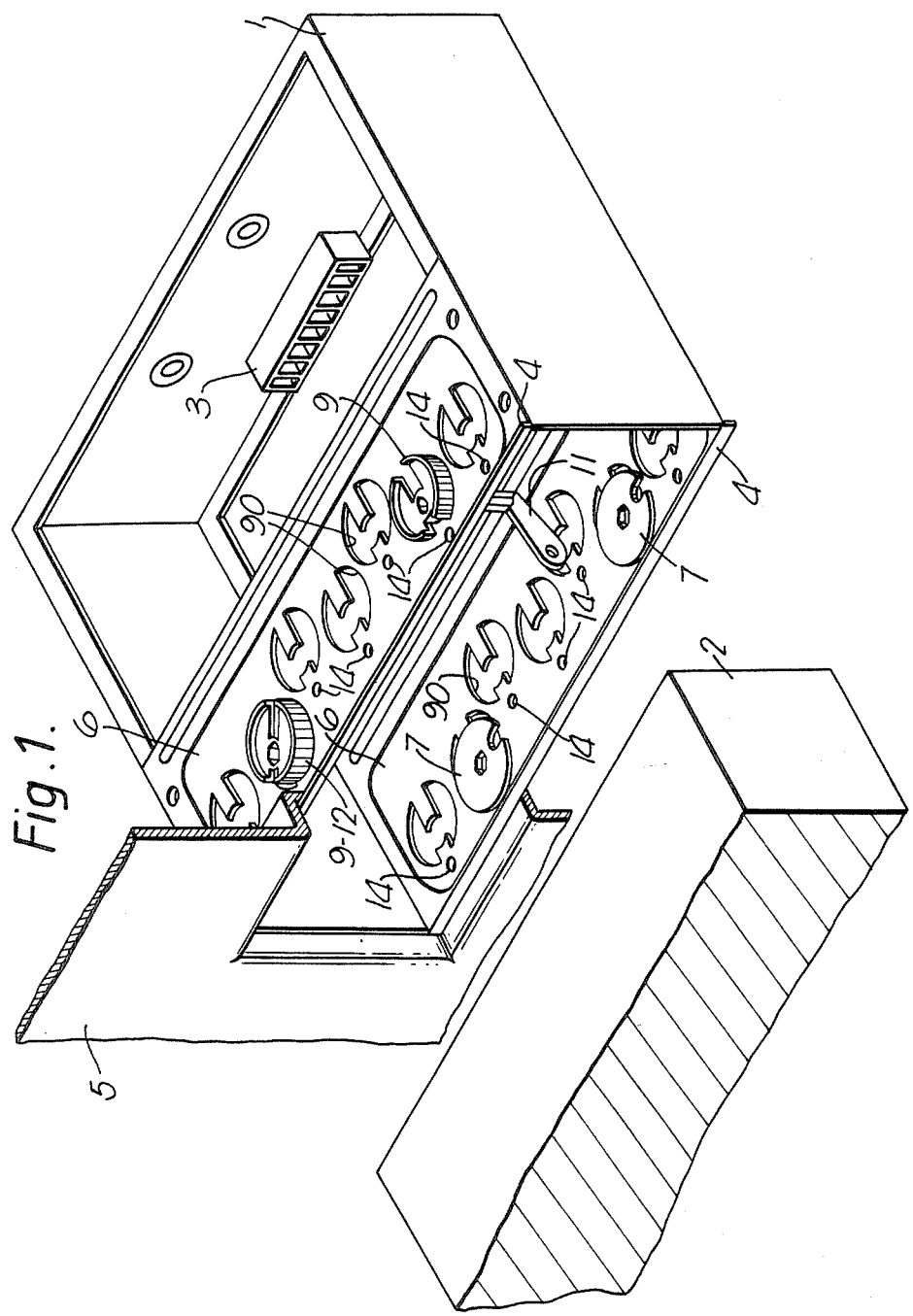
FIG. 1 is a perspective view of the invention already fixed on an instrument panel.

Said figures, and in particular FIG. 1, show a holder 1 in the conventional form of a parallelepipal box of thin sheet metal, open at one end to allow insertion of a normal extractable automobile radio 2.

At the opposite rear end of the holder 1 there is a suitable terminal block 3 for the electrical connections to the automobile radio 2, and along the longer front edges of the mouth of the holder 1 there are externally provided two small flanges 4 to rest along the marginal edge of the normal standard opening provided in the instrument panel 5 of a motor vehicle.

With further reference to FIG. 1, to the rear of each flange 4, on the corresponding wall of the holder 1, there is provided a small external projection 6 obtained by drawing, so that on the inside of the same wall there is a corresponding slight recess. In the base of this latter there is provided a series of identical apertures able to receive the locking member, which is described hereinafter with reference to the accompanying FIGS. 3 and 4. As can be clearly seen, said member comprises a thin disc-shaped portion 7 from which there extends a short axial pivot 8, on the opposite end of which there is eccentrically disposed a cyathiform element 9. This latter has a radius less than the radius of the disc-shaped portion 7, and its eccentricity is practically equal to the difference between said two radii.

The disc-shaped portion 7 and pivot 8 are traversed by a hexagonal cavity 10 to provide a seat for receiving an operating key 11 (see FIG. 1) which accompanies the invention, or for another suitable key.

The thickness of the disc-shaped portion 7 is practically equal to the depth of said drawn portion 6, so as not to hinder insertion of the automobile radio 2, and for the same reason the outer circumferential edge of said disc-shaped portion 7 is conveniently bevelled (FIG. 4).

The distance between the two disc-shaped portions 7 and 9 is practically equal to the thickness of the sheet metal of the holder 1. From FIG. 3 it can be seen that the eccentric cam portion 9 comprises two aligned radial slots 99 which terminate in correspondence with the pivot 8. Furthermore, the outer cylindrical surface of this cam comprises small toothing or knurling 12, and along that part of the disc-shaped portion 7 which projects beyond the cam 9 there is a positioning notch 13. As clearly shown in FIGS. 1, 2 and 5, the cam 9 is intended to be inserted through one of the apertures 90 provided in the holder 1, said insertion being effected after this latter has been introduced into the standard opening in the instrument panel 5. Alignment between the aperture 90 and cam 9 is facilitated by the presence to the side of said aperture 90, of a small frontal hole 14 with which said positioning notch 13 must be aligned. It should also be noted that the apertures 90 have practically the same dimensions as the plan contour of the cam 9, and each aperture 90 consists of a circular hole interrupted by two opposing inwardly projecting lugs 91. The facing edges of these latter are of concave arched shape to act as a guide for the pivot 8.

On termination of said insertion, the disc-shaped portion 7 rests against the inner wall of the holder 1, and is contained within the recessed portion 6, whereas the cam 9 is situated on the outside of the holder 1.

The cam member 7, 9 is rotated by the key 11 to clamp the instrument panel 5 between the flange 4 and the cam 9 of the cam member. By tightening the cam 9 with a sufficient force, reliable locking of the holder 1 on the instrument panel 5 is obtained, due in particular to the presence of the teeth 12 which oppose undesirable contrary rotation of the cam, for example due to vehicle vibration.

It is obviously preferable to use two cam members for each connection wall of the holder 1 (see FIGS. 1 and 2), and in order to allow the holder 1 to be mounted on instrument panels 5 of different thicknesses, various pairs of opposing apertures 90 are provided at different distances from the flange 4 (see FIG. 2).

Figure 5:
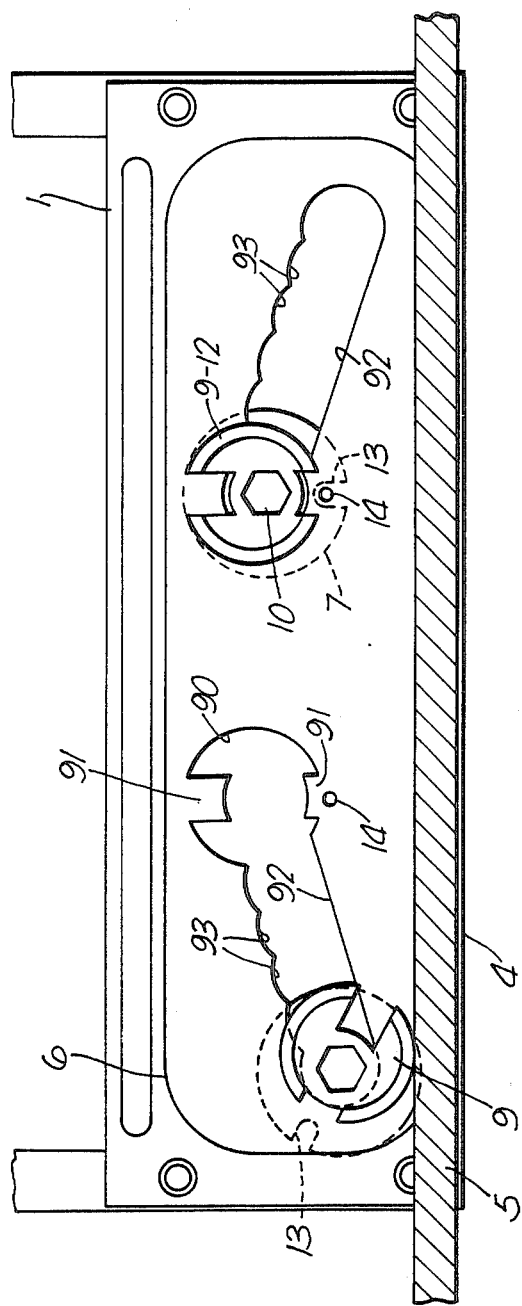
FIG. 5 is a view similar to that of FIG. 2, showing a second embodiment of the invention.

As an alternative to said set of apertures 90, as shown in FIG. 5 there can be provided in each connection wall of the holder 1 a single application seat for the cam member, along which this latter can be positioned according to the thickness of the instrument panel 5.

From FIG. 5 it can be seen that said seat is of elongated form converging towards the flange 4, and comprises at that end most distant from said flange 4 an aperture 90 similar to those described heretofore, from which there extends a slot 92. With the aperture 90 there is associated a small hole 14 for the aforesaid purpose, and said slot is rectilinear along that longitudinal edge closer to the flange 4, whereas the opposite longitudinal edge comprises a succession of identical concave arched portions 93 to form a like number of seats for the rotation of the pivot 8. Finally, said arched portions 93 have practically the same radius of curvature as the cylindrical pivot 8, and the distance between the rectilinear edge of the slot 92 and the separation crests of said arched portions 93 is practically equal to the diameter of the pivot 8.

The invention is not limited to the individual embodiments described and illustrated, but can comprise all technical equivalents to the aforesaid means, and their combinations, provided they fall within the scope of the following claims.

What is claimed is:

1. The combination of a holder for extractable automobile radios of a motor vehicle, said motor vehicle having a panel with an aperture, which comprises a parallelepipal box having an opening for the insertion of said automobile radio, and an external rim surrounding said opening, said rim abutting against the perimetral edge of said opening provided in the panel of said motor vehicle, said box having, in at least one wall at least one profiled aperture, and a cam-shaped locking member, said locking member comprises a flat portion, a central pivot extending therefrom and a disc-shaped portion eccentrically located with respect to said pivot and of dimensions less than those of said flat portion, said locking member upon rotation of said disc-shaped portion in said opening, clamping said rim against said panel.

2. The combination according to claim 1, wherein the distance between said flat portion and said disc-portion is slightly greater than the thickness of the wall of said box.

3. The combination according to claim 1, wherein the outer cylindrical surface of said disc-shaped portion is provided with knurls.

4. The combination according to claim 1, wherein said eccentric disc-shaped portion is provided with at least one radial slot which terminates in corresondence with said central pivot.

5. The combination according to claim 1, wherein said at least one aperture in said box is formed in a recessed portion provided in the inner surface of the box.

6. The combination according to claim 5, wherein said flat portion of said locking member has a thickness practically equal to the depth of said recessed portion, has its outer edge bevelled and is provided with a lateral notch, said at least one aperture has a hole and said notch aligns with said hole when the radio is inserted in said holder.

7. The combination according to claim 1, wherein said box has at least two walls, a series of pairs of apertures, is provided in each of said two walls, said apertures are disposed at different distances from said rim.

8. The combination according to claim 1, wherein said box has at least two walls, each wall has at least one elongated passage inclined with respect to said rim, at the end most distant from said rim it comprises an aperture, a slot extends from said aperture, the slot is rectilinear along the edge situated on the same side as the rim, the opposite edge of the slot consists of a plurality of concave arched portions.

9. The combination as claimed in 1, wherein said flat portion is provided with a key seat.

* * * * *